United States Patent
Baldwin et al.

(10) Patent No.: US 11,415,174 B2
(45) Date of Patent: Aug. 16, 2022

(54) LUBRICATION SYSTEM

(71) Applicant: Bell Helicopter Textron Inc., Fort Worth, TX (US)

(72) Inventors: Tyler Wayne Baldwin, Keller, TX (US); Kyle Thomas Cravener, Watauga, TX (US); Tyson Henry, Arlington, TX (US)

(73) Assignee: Textron Innovations Inc., Providence, RI (US)

( * ) Notice: Subject to any disclaimer, the term of this patent is extended or adjusted under 35 U.S.C. 154(b) by 522 days.

(21) Appl. No.: 16/381,106

(22) Filed: Apr. 11, 2019

(65) Prior Publication Data

US 2020/0325937 A1 Oct. 15, 2020

(51) Int. Cl.
| | |
|---|---|
| *F16H 57/04* | (2010.01) |
| *F16C 33/66* | (2006.01) |
| *B64C 27/12* | (2006.01) |
| *F16D 33/18* | (2006.01) |
| *F16H 57/038* | (2012.01) |

(52) U.S. Cl.
CPC .......... *F16C 33/6633* (2013.01); *B64C 27/12* (2013.01); *F16D 33/18* (2013.01); *F16C 2202/50* (2013.01); *F16H 57/038* (2013.01); *F16H 57/0424* (2013.01); *F16H 57/0442* (2013.01); *F16H 57/0479* (2013.01)

(58) Field of Classification Search
CPC ............. F16H 57/0424; F16H 57/0442; F16H 57/0479; F16H 57/041; F16H 57/04; F16C 33/6633; F16C 2202/50
See application file for complete search history.

(56) References Cited

U.S. PATENT DOCUMENTS

| | | | |
|---|---|---|---|
| 10,883,659 B2 * | 1/2021 | LaBerge | ................... F16N 9/00 |
| 2015/0337949 A1 * | 11/2015 | Ziegler | ................... F16C 17/04 |
| | | | 475/159 |

* cited by examiner

*Primary Examiner* — Huan Le

(74) *Attorney, Agent, or Firm* — Fogarty LLP

(57) ABSTRACT

Embodiments are directed to solid lubricant assemblies for providing over temperature protection for bearings and gears in rotorcraft systems. A solid lubricant enters a fluid state above a certain temperature and is positioned so that fluid lubricant is applied to the bearings or gears.

8 Claims, 8 Drawing Sheets

LUBRICATION SYSTEM

BACKGROUND

A rotorcraft may include one or more rotor systems. One example of a rotorcraft rotor system is a main rotor system. A main rotor system may generate aerodynamic lift to support the weight of the rotorcraft in flight and thrust to counteract aerodynamic drag and move the rotorcraft in forward flight. Another example of a rotorcraft rotor system is a tail rotor system. A tail rotor system may generate thrust in the same direction as the main rotor system's rotation to counter the torque effect created by the main rotor system. A rotor system may include one or more pitch links to rotate, deflect, and/or adjust rotor blades and a power source, such as an engine and transmission, to drive the rotor system.

Typically, the rotor system and power source in a rotorcraft has a number of bearings and geared components that facilitate the interaction of moving parts. The bearings and gears generate heat during use and their useful lifespan is decreased due to wear. To counteract such wear, lubricants may be sprayed onto moving components. In other embodiments, self-lubricating bearings may incorporate lubricants, such as Teflon, in a bearing liner. While the known lubrication systems may extend the lifespan of bearings and gears, such systems do not provide sufficient protection.

SUMMARY

In one aspect, embodiments are directed to an aircraft gearbox comprising a gearbox housing, and a planetary gear set disposed within the gearbox housing. The planetary gear set comprises a planetary carrier, a plurality of planet gears, each of the planet gears having a post for attaching the planet gear to the planetary carrier, and a solid-lubricant block positioned within each post. The solid-lubricant block comprises a lubricant material, a case surrounding the lubricant material, and one or more openings in the case, wherein the openings are adapted to allow the lubricant material to seep onto an associated planet gear when the lubricant material is in a fluid state. One or more weep holes in each of the posts are configured to align with the one or more openings in the solid-lubricant block case. The weep holes are adapted to allow the lubricant material to seep onto the associated planet gear and/or planet gear bearings when the lubricant material is in a fluid state. The solid-lubricant block further may comprise a spring mechanism positioned between the lubricant material and an interior wall of the case, wherein the spring mechanism provides a force on the lubricant material in a direction toward the one or more openings. A melting point for the lubricant material is greater than a gearbox normal operating temperature by a threshold amount, wherein the threshold amount ensures that the lubricant material enters a fluid state only in an overheat condition.

In another aspect, an embodiment is directed to an aircraft gearbox comprising a gearbox housing, a first bevel gear configured to rotate with a first shaft, a second bevel gear configured to rotate with a second shaft, the second bevel gear positioned to engage with the first bevel gear, and a solid-lubricant assembly positioned within the first shaft. The solid-lubricant assembly comprises a lubricant material, a case surrounding the lubricant material, and one or more openings in the case, wherein the openings are adapted to allow the lubricant material to seep onto the first bevel gear when the lubricant material is in a fluid state. A spring mechanism positioned between the lubricant material and an interior wall of the case may provide a force on the lubricant material in a direction toward the one or more openings. The case may comprise a metal alloy adapted to transfer heat from the first bevel gear to the lubricant material. The one or more openings in the case may be adapted to apply the lubricant material at least at a location where the second bevel gear engages with the first bevel gear. The aircraft gearbox may further comprise a cover positioned over the first bevel gear and adapted to capture fluid lubricant from the solid-lubricant assembly.

In a further aspect, embodiments are directed to a rotorcraft, comprising a body, a power train coupled to the body and comprising a power source and a drive shaft coupled to the power source, a hub, a rotor blade coupled to the hub, a swashplate positioned about the drive shaft, a pitch link coupled between the swashplate and the hub corresponding to the rotor blade, and a bearing assembly coupled to the rotor blade. The bearing assembly comprises a bearing positioned within a bearing race, and a solid lubricant abutting the bearing race. The solid lubricant comprises a material that is configured to enter a fluid state above a certain temperature, wherein the solid lubricant is located at a position to allow lubricant material to seep between the bearing and the bearing race when the lubricant material is in a fluid state. A spring mechanism may be positioned to apply a force against the solid lubricant so that the solid lubricant maintains physical contact with the bearing race. In other embodiments, a force, such as the centrifugal force in a rotating body, may be used to draw the fluid lubricant through a bearing or protected system.

The solid-lubricant disclosed herein is suitable for any type of bearing, including spherical and roller bearings. The solid-lubricant increases overall bearing longevity. Additionally, the solid-lubricant can provide emergency lubrication during a loss of lubrication event, such as in a drive system or a for gearbox component.

BRIEF DESCRIPTION OF THE DRAWINGS

Figure 1:
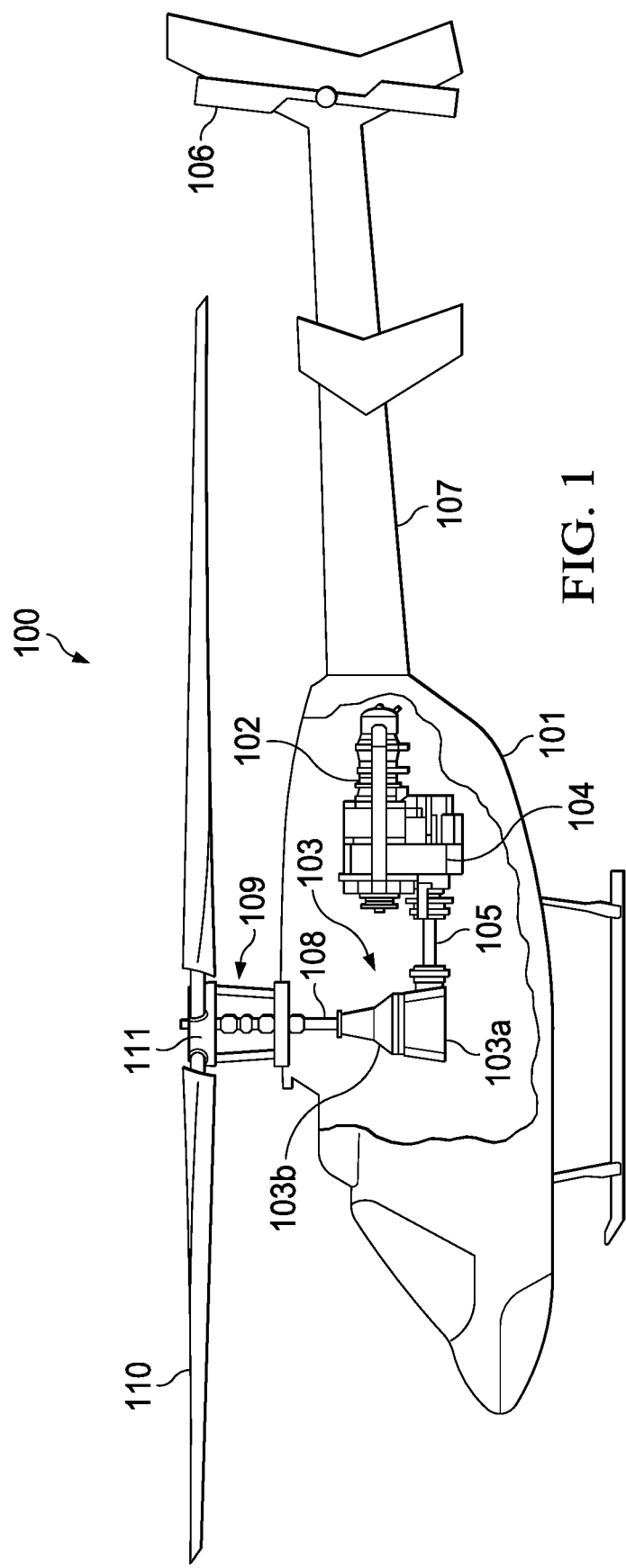

Having thus described the invention in general terms, reference will now be made to the accompanying drawings, which are not necessarily drawn to scale, and wherein:

FIG. 1 illustrates a helicopter with a main rotor gearbox and rotor assembly capable of employing embodiments of the disclosed solid lubricant system.

Figure 2:
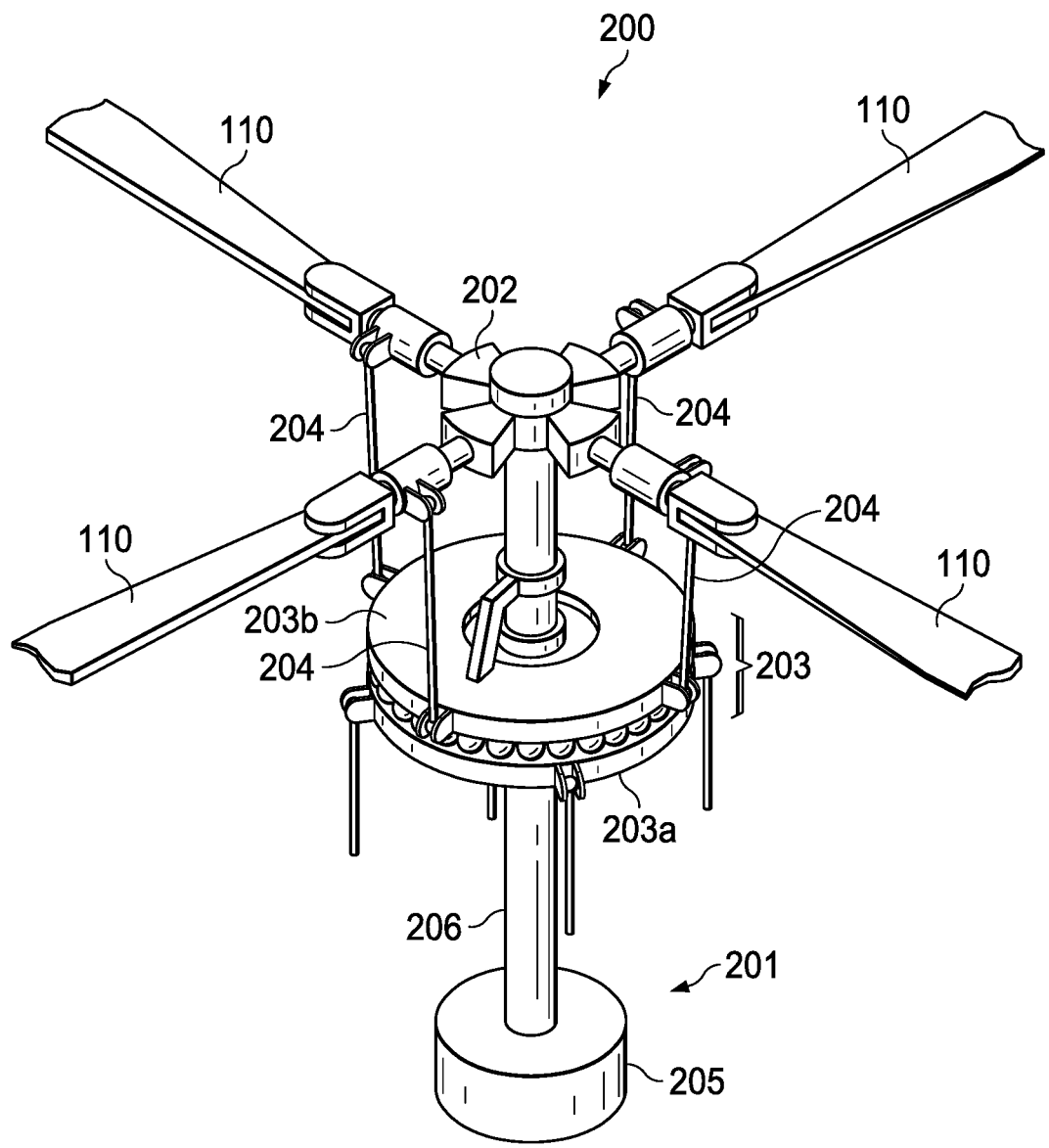

FIG. 2 illustrates a rotor system and blades according to an example embodiment.

Figure 3:
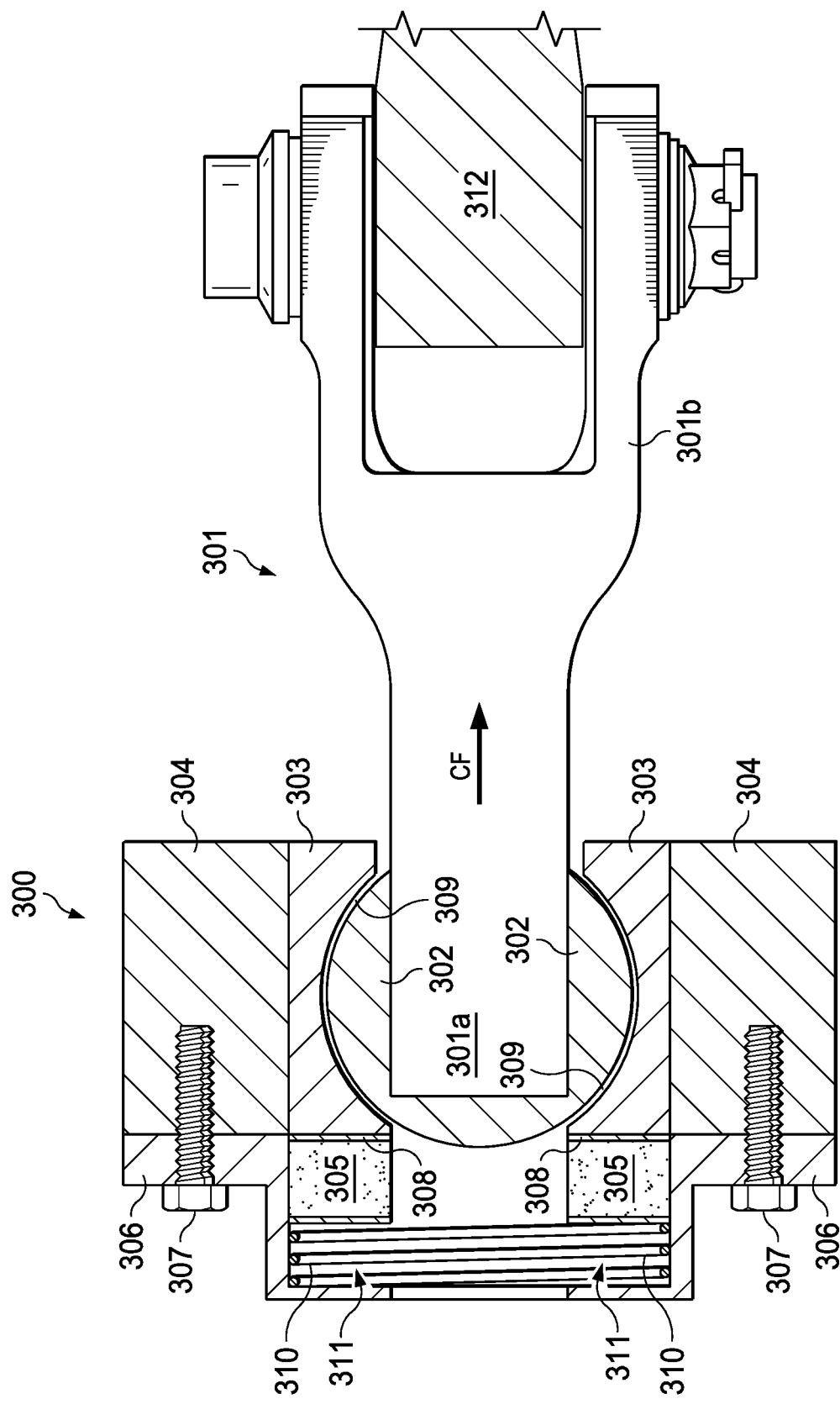

FIG. 3 shows a cross-section view of a bearing assembly that is secured to a shaft according to an example embodiment.

Figure 4:
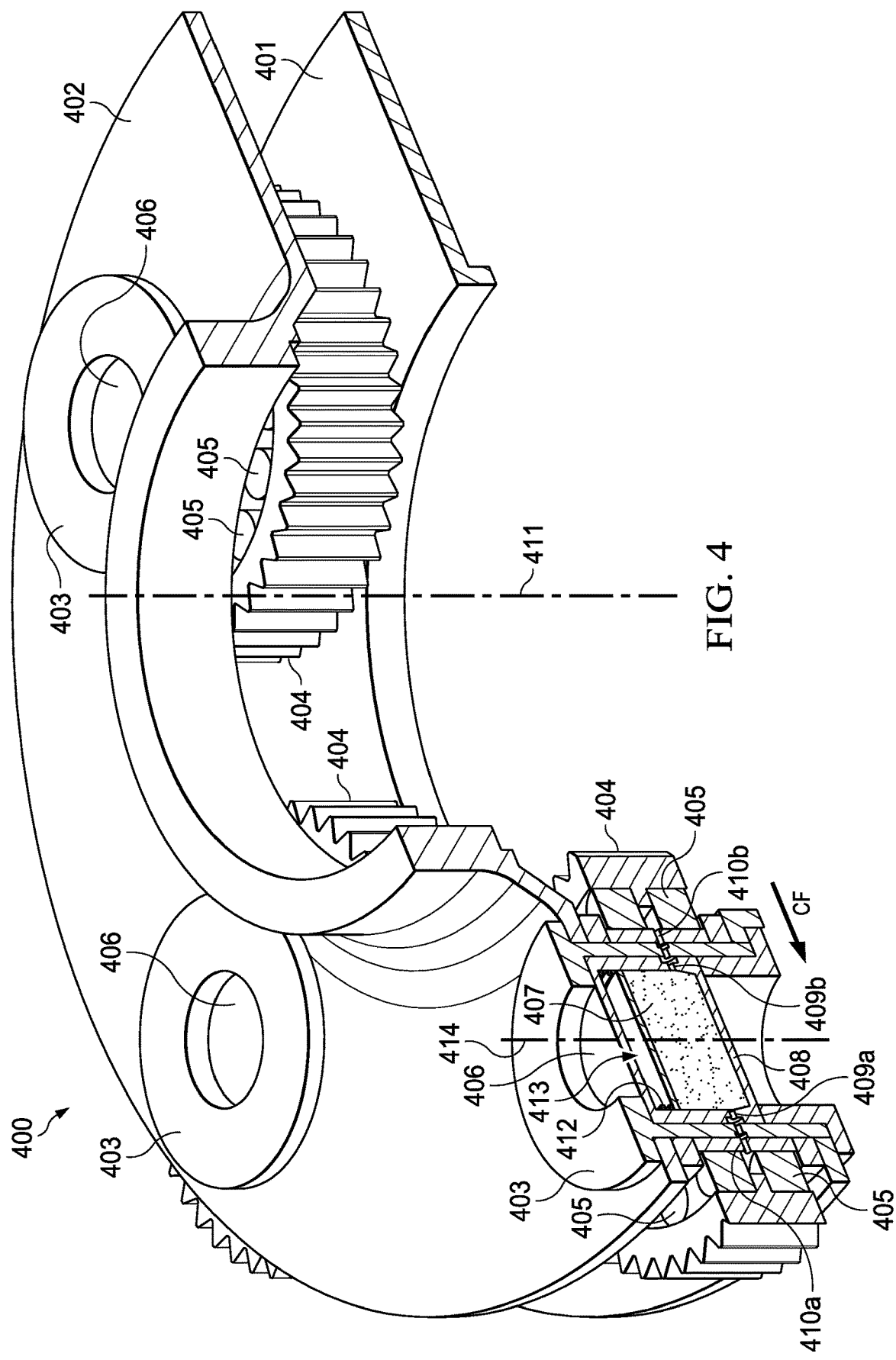

FIG. 4 depicts a portion of planetary carrier.

Figure 5:
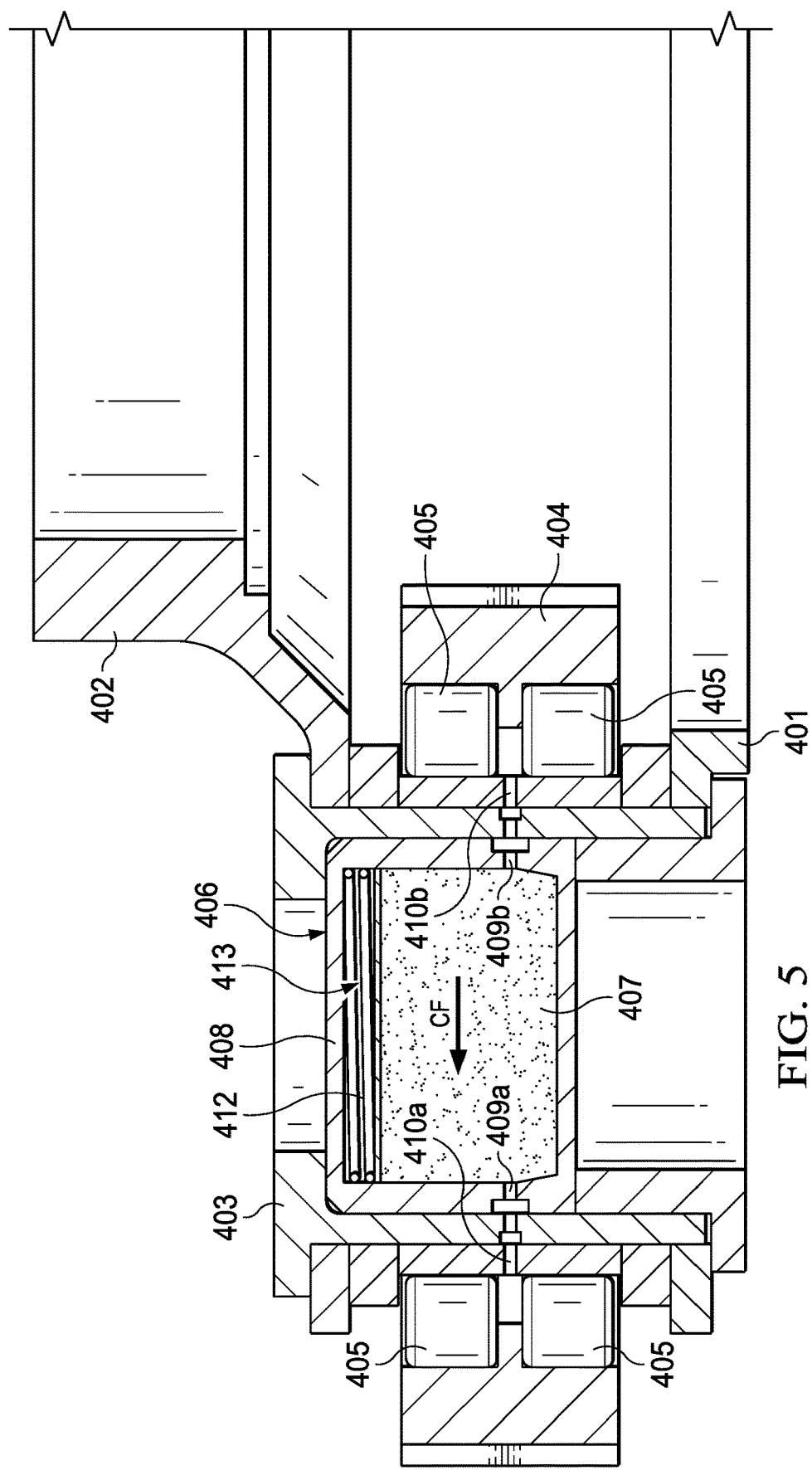

FIG. 5 depicts a cross section of a planetary gear mounted on the planetary carrier of FIG. 4.

Figure 6:
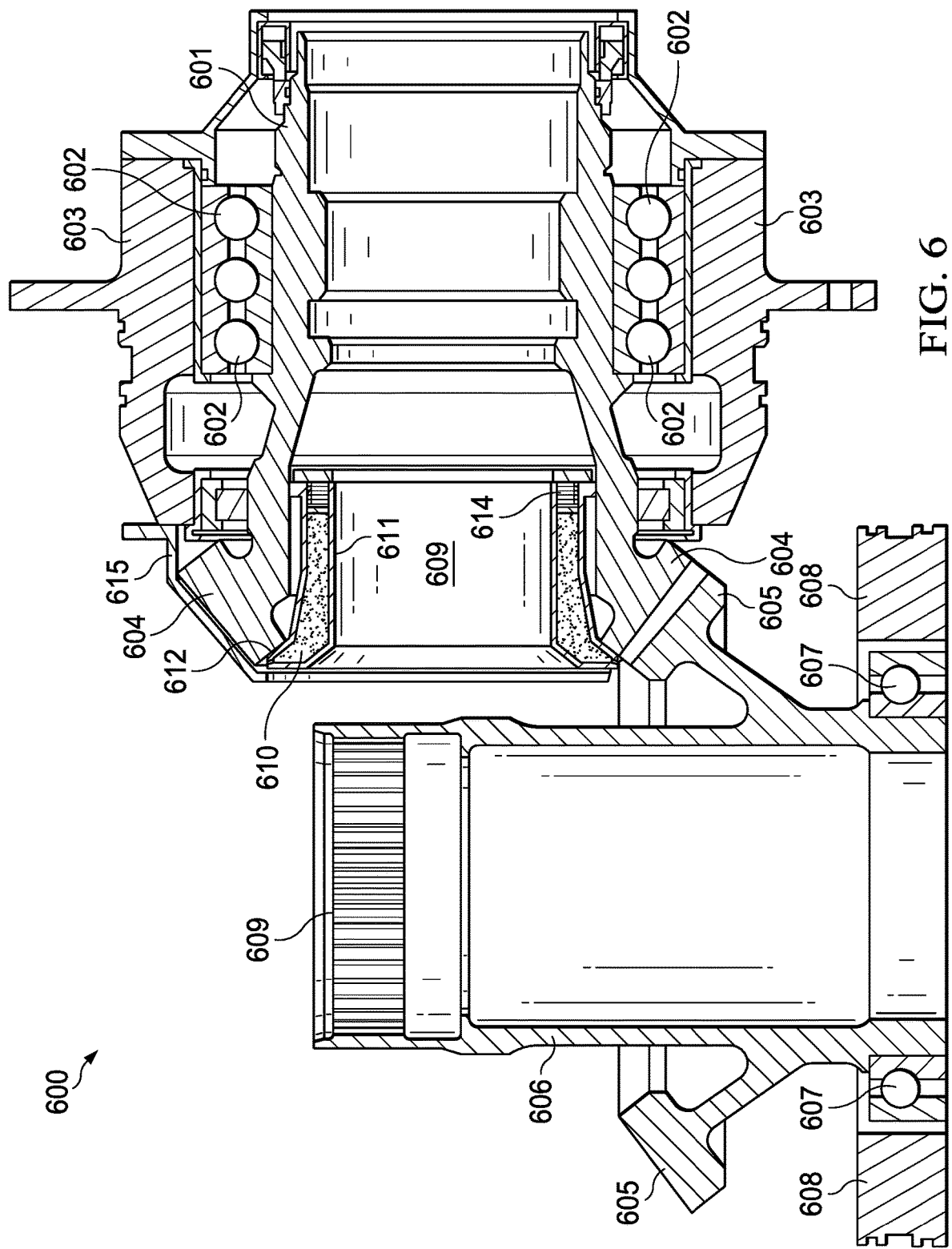

FIG. 6 is a cross section of a helical bevel gear set.

Figure 7:
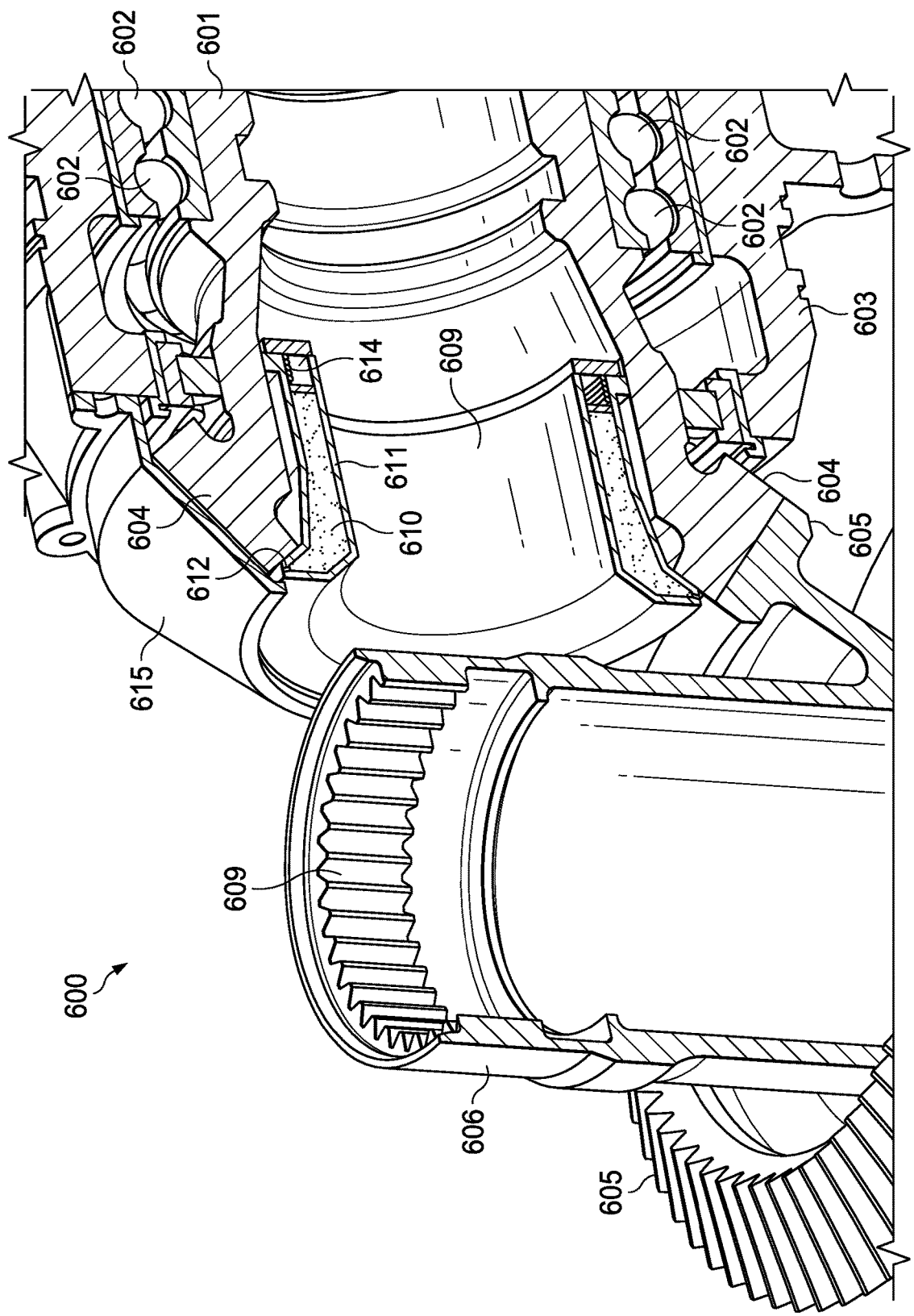

FIG. 7 depicts a cut-away view of the helical bevel gear set shown in FIG. 6.

Figure 8:
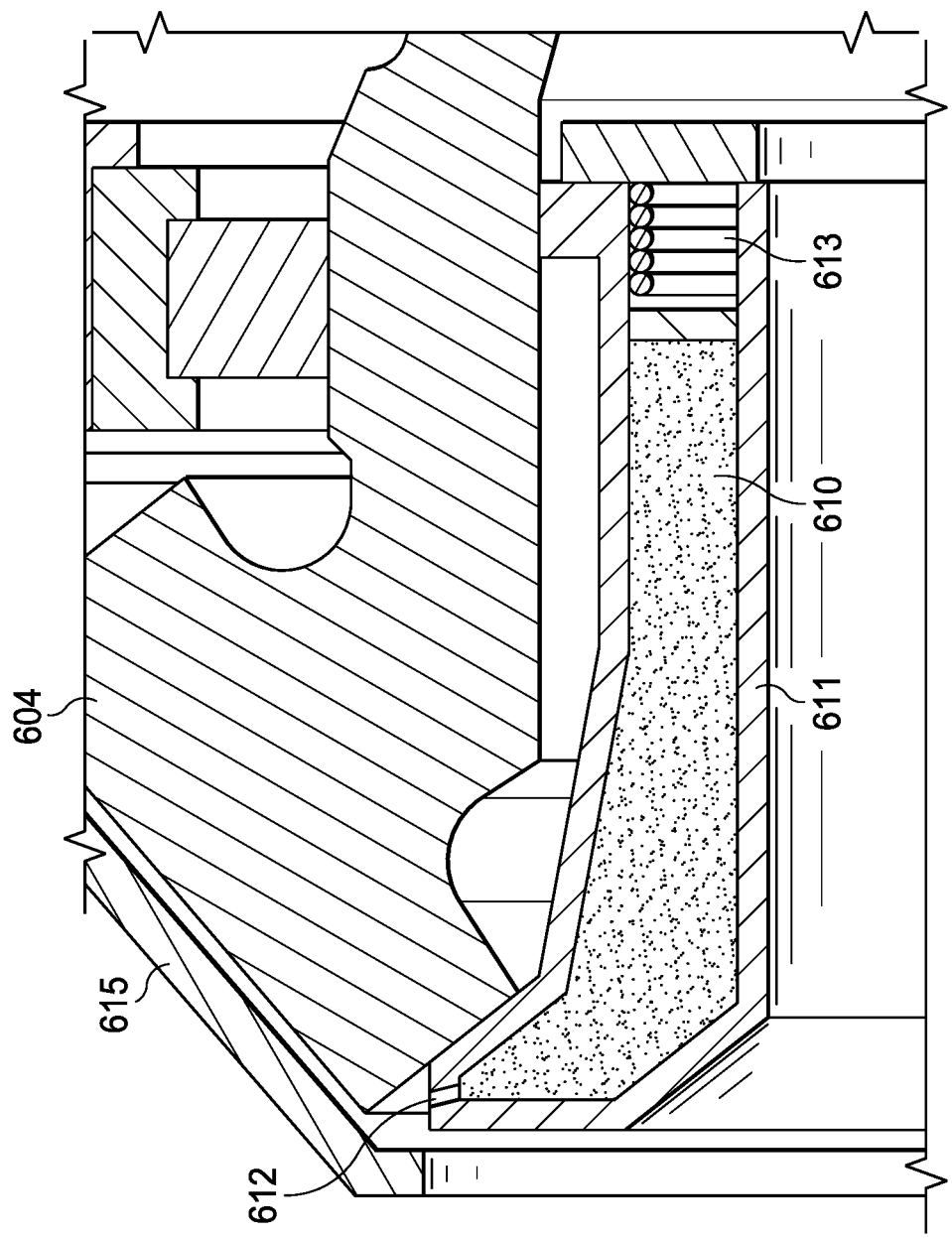

FIG. 8 depicts a solid lubricant system for a first bevel gear in the helical bevel gear set of FIG. 6.

While the system of the present application is susceptible to various modifications and alternative forms, specific embodiments thereof have been shown by way of example in the drawings and are herein described in detail. It should be understood, however, that the description herein of specific embodiments is not intended to limit the system to the particular forms disclosed, but on the contrary, the intention is to cover all modifications, equivalents, and alternatives falling within the spirit and scope of the present application as defined by the appended claims.

DETAILED DESCRIPTION

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the device described herein may be oriented in any desired direction.

FIG. 1. illustrates a helicopter 100 comprising a fuselage 101, an engine 102, a main rotor gearbox (MRGB) 103 that is mechanically coupled to the engine 102 through an accessory gearbox 104. Accessory gearbox 104 has a drive-shaft 105 powering MRGB 103. The accessory gearbox 104 also has a rear drive-shaft (not shown) that powers the tail rotor 106, which functions as an anti-torque system mounted on tail member 107. Accessory gearbox 104 has attachment points for the engine accessories, such a starter-generator, a fuel pump, tachometers, etc. A mast 108 mechanically couples MRGB 103 to rotor system 109. The rotor system 109 comprises rotor blades 110 that are coupled to mast 108 via a hub 111. Engine 102 supplies torque to main rotor mast 101 via MRGB 103 to rotate main rotor blades 110. Engine 102 also supplies torque to a tail rotor drive shaft to rotate tail rotor 106.

Rotor blades 110 provide lift to enable flight for helicopter 100. The rotor blades 110 are controlled by multiple controllers within fuselage 101. The thrust vector created from the rotor can be selectively manipulated to control direction, and amplitude for flight via collective and cyclic changes in rotor blade pitch. For example, during flight a pilot can manipulate a cyclic controller to change the pitch angle of rotor blades 110 and/or manipulate pedals to provide vertical, horizontal, and yaw flight movement. Further, the pitch of tail rotor 106 blades can be selectively controlled to selectively control yaw of helicopter 100.

Gearbox 103 functions to convert high speed rotation of output drive shaft 105 of engine 102 into lower speed rotation of main rotor mast 108. MRGB 103 may have multiple parts, such as an upper case 103a and a lower case 103b. Gearbox 103 may include a plurality of gears and bearings. A gear is a rotating part having teeth that mesh with another toothed part to transmit torque. Gears in MRGB 103 may be used to provide speed and torque conversions. A bearing may include any of various machine elements that constrain the relative motion between two or more parts to only the desired motion. Bearings in MRGB 103 may perform tasks such as supporting a gear shaft. Gears, bearings, and other mechanical components of MRGB 103 are subject to wear and heat generation due to contact with other components and may need to be repaired or replaced over time.

It should be appreciated that the embodiments disclosed in the present application may be used on aircraft other than helicopters, such as airplanes, tilt rotors, unmanned aircraft, to name a few examples. Further, the embodiments of the present application may be used on non-aircraft vehicles and implementations. For example, in the illustrated example, MRGB 103 is depicted as a gearbox on helicopter 100; however, it should be appreciated the embodiments disclosed herein may be equally implemented on a variety of other vehicles.

FIG. 2 shows rotor system 200 and blades 110 of FIG. 1 according to an example embodiment. Rotor system 200 features a power train 201, a hub 202, a swashplate 203, and pitch links 204. In some examples, rotor system 200 may include more or fewer components, such as a gearbox, drive links, drive levers, and other components that may be incorporated. Power train 201 features a power source 205 and a mast 206. Power source 205, mast 206, and hub 202 are mechanical components for transmitting torque and/or rotation. Power train 201 may include a variety of components, including an engine, a transmission, and differentials. In operation, mast 206 receives torque or rotational energy from power source 205 and rotates hub 202. Rotation of rotor hub 202 causes blades 110 to rotate about mast 206.

Swashplate 203 translates rotorcraft flight control input into motion of blades 110. Because blades 110 are typically spinning when the rotorcraft is in flight, swashplate 203 may transmit flight control input from the non-rotating fuselage to the hub 202, blades 110, and/or components coupling hub 202 to blades 110 (e.g., grips and pitch horns). References in this description to coupling between a pitch link and a hub may also include, but are not limited to, coupling between a pitch link and a blade or components coupling a hub to a blade. In some examples, swashplate 203 may include a non-rotating swashplate ring 203a and a rotating swashplate ring 203b. Non-rotating swashplate ring 203a does not rotate with mast 206, whereas rotating swashplate ring 203b does rotate with mast 206. In the example of FIG. 2, pitch links 204 connect rotating swashplate ring 203b to blades 110.

In operation, according to one example embodiment, translating the non-rotating swashplate ring 203a along the axis of mast 206 causes the pitch links 204 to move up or down. This changes the pitch angle of all blades 110 equally, increasing or decreasing the thrust of the rotor and causing the aircraft to ascend or descend. Tilting the non-rotating swashplate ring 203a causes the rotating swashplate ring 203b to tilt, moving the pitch links 204 up and down cyclically as they rotate with the drive shaft. This tilts the thrust vector of the rotor, causing rotorcraft 100 to translate horizontally following the direction the swashplate is tilted.

In the example illustrated in FIG. 2, components of rotor system 200 may be subject to a variety of forces, such as torsional, axial, and cocking forces. For example, mast 206 may transfer some torsional, axial, and cocking forces towards hub 202. Bearings may be provided to reduce component wear due to these forces, such as elastomeric bearings or sliding element bearings. As friction and/or pressure is applied to the bearings over time, the bearings are subject to wear and deterioration. For example, the bearings may be replaced during scheduled maintenance at specific calendar times, flight hours, or flight cycles, or may be initiated based upon the condition of components, such as unscheduled maintenance on components that fail, do not meet standards, or reach deterioration limits. Teachings of certain embodiments recognize, however, the capability to reduce or slow bearing wear and deterioration using lubricants.

FIG. 3 shows a cross-section view of a bearing assembly 300 that is secured to a spindle assembly 301 according to an example embodiment. Spindle assembly 301 comprises a shaft portion 301a and a cuff portion 301b, which is bifurcated at its outer end for bolted attachment to the root end of a rotor blade 312. Bearing assembly 300 features a bearing 302, a bearing race 303, and a bearing retainer 304 that surround the shaft portion 301a of spindle 301. It will be understood that bearing assembly 300 is simplified for purposes of illustration and in other embodiments may comprise additional components. In the example of FIG. 3, bearing retainer 304 may be a rigid element featuring a first opening therethrough. Bearing retainer 304 may be made of a variety of materials, such as metal or a metallic alloy. Other bearing components, such as bearing 302 and bearing race 303 may reside inside the first opening. Bearing retainer may be a component of a rotor hub. In other embodiments, shaft 301a may represent a drive shaft or a component in mechanical communication with a drive shaft. During operation, according to one embodiment, bearing 302 may receive a variety of forces, such as torsional, axial, and cocking forces, from shaft 301a. Such forces cause wear on bearing 302 over time.

Bearing assembly 300 further comprises a solid lubricant 305 that is in direct, physical contact with bearing race 303 and may be in contact with at least part of bearing 302. Solid lubricant 305 is held in place by a cap 306 that is attached to bearing retainer 304 using fasteners 307, such as bolts. Cap 306 may be made of a variety of materials, such as metal or a metallic alloy. Solid lubricant 305 has a specific melting temperature. During operation, friction causes bearing 302 and bearing race 303 to heat up. As the bearing temperature reaches the melting temperature of lubricant 305, the solid lubricant liquifies into a fluid state along thermal interface 308. The fluid lubricant is then drawn into the interface 309 between bearing 302 and bearing race 303, which reduces the friction in bearing assembly 300 and the heat generated by that friction. The temperature in bearing 302 will then drop due to the lubricant 305.

The fluid lubricant may be drawn into the bearing assembly 300 by gravity or by a centrifugal force (CF). For example, if shaft 301a points radially outward like, such as part of a spindle on a rotorcraft, the rotation of shaft 301a around a rotor hub will generate a force CF, which will draw fluid lubricant into interface 309. In other embodiments, lubricant 305 may be held in direct, physical contact with bearing race 303 and bearing 302 using, for example, a spring 310. The force generated by spring 310 is translated through lubricant 305 and against thermal interface 308 to force fluid lubricant onto bearing 302. In other embodiments, other means may be used to generate a force against lubricant 305 to maintain contact with bearing race 303 and bearing 302, such as a pressurized gas or air within space 311 between lubricant 305 and cap 306. Spring 310 may be any type of compression spring device, such as a helical compression spring, conical spring, leaf spring, torsion spring or the like.

Solid lubricant 305 improves the life of bearing 302 and in other embodiments can be applied to any lined interface between parts. Bearing assembly 300 with lubricant 305 may be used with spherical bearings or roller bearings for any application, such as pitch link bearings or swashplate bearings in rotorcraft 100.

Solid lubricant 305 may be, for example, an organic compound, such as waxes, fats, or soaps, or a thickened lubricating grease having improved high temperature life by reason of the inclusion of waxes. The melting temperature of solid lubricant 305 is selected to create a fluid lubricant at or above an operating temperature of bearing 302. As a result, solid lubricant 305 remains in a solid state under normal environmental conditions but becomes fluid along thermal interface with bearing 302 under high operating temperatures.

Cap 306 may be removed during a maintenance procedure, for example, to replace solid lubricant 305 thereby extending the lifespan of bearing 302 and minimizing the maintenance required to replace or refurbish bearing assembly 300.

Referring again to FIG. 1, main rotor gearbox 103 converts speed and torque between the engine 102 and the rotor system 109. Gearbox 103 may be configured to reduce the speed of the rotational output of engine 102, while increasing the torque applied to blades 110. Rotorcraft gearbox 103 comprises a gear train that includes many interacting components that generate friction and heat. For example, the gearbox may include helical bevel gears that convert rotation around one axis to rotation around a perpendicular axis and planetary gears that transfer high torque loads. During operation, the forces generated by the rotorcraft gearbox and the interaction of the gears cause friction and heat, which lead to wear and deterioration of the gear train components. Existing gear trains use oil or grease to lubricate the moving parts and to reduce wear. In other embodiments, solid lubricants that are embedded within the gear train components may be used to protect the gearbox system.

FIGS. 4 and 5 depict a planetary carrier 400 within a planetary gear set. Planetary carrier 400 comprises a lower plate 401, an upper plate 402, and planetary post assemblies 403 extending between the lower and upper plates. Each post assembly 403 defines a rotational axis for a corresponding planet gear 404 rotatably mounted thereon. Planet gears 404 are mounted on the post assemblies 403 using roller bearings 405. During use, planet gears 404 all mesh with a central sun gear (not shown). Each planet gear also meshes with a surrounding ring gear (not shown).

Within each post assembly 403 is a lubricant block 406 having a solid lubricant 407 as described herein within an outside case 408. The case 408 may be constructed of a variety of materials, such as metal or a metallic alloy and has weep holes 409a,b that provide a passage between the inside and outside of case 408. Post assembly 403 also has weep holes 410 aligned with weep holes 409a,b in the lubricant case 408. In a solid form, lubricant 407 is contained within case 408. During operation, friction will heat planetary gear 404. That heat is passed to lubricant case 408. If the temperature of case 408 rises above the melting temperature of lubricant 407, then the lubricant 407 will begin to enter a fluid state. In fluid form, the lubricant 407 may flow out of case 408 through weep holes 409a,b. The fluid lubricant may then pass to roller bearings 405 through weep holes 410 thereby providing lubrication for roller bearings 405 and planetary gear 404. As each planetary gear 404 rotates on its post 403, the fluid lubricant will be distributed across all roller bearings 405 for each gear 404.

When planetary carrier 400 is rotating, an outward-directed centrifugal force (CF) is generated away from carrier axis 411, which tends to force the fluid lubricant toward and through outside weep holes 409a and 410a. Additional fluid lubricant may pass through inner weep holes 409b and 410b, such as if solid lubricant is under pressure within case 408. Pressure may be generated, for example, by applying a force within case 408 using a spring 412. The force generated by spring 412 may be configured to push solid lubricant 407 against the sides and bottom of case 408 to facilitate flow through weep holes 409a,b. In other embodiments, other means may be used to generate a force against lubricant 407, such as a pressurized gas or air within space 413 between lubricant 407 and case 408.

In other embodiments, post 403, planetary gear 404, and lubricant block 406 may be configured so that lubricant case 408 and the solid lubricant 407 stored therein rotate with planetary gear 404 around planetary axis 414. Such rotation with planetary gear 404 would generate a centrifugal force away from axis 414 and would drive the fluid lubricant though both weep holes 409a,b in case 408.

The embodiment illustrated in FIG. 4 depicts a portion of planetary carrier 400 having a total of five planetary gears 404; however, it will be understood that a different number of planetary gears 404 may be used in other embodiments. According to the present embodiment, carrier 400 is a conventional planetary carrier with planetary posts 403 extending between the lower plate 401 and upper plate 402. However, one skilled in the art will appreciate that other configurations and orientations are possible for the planetary gear set, including the planetary carrier 400. For instance, in an alternative embodiment the planetary carrier may be an overhung planetary carrier, having a plurality of downwardly-extending, cantilevered posts configured to receive each of the plurality of planet gears 404. Each post would define the rotational axis for a corresponding planet gear 404 rotatably mounted thereon. Lubricant blocks 406 may be installed in such downwardly-extending, cantilevered posts in a similar manner as illustrated in FIGS. 4 and 5.

FIGS. 6, 7, and 8 depict a helical bevel gear set 600 according to an example embodiment. An input shaft 601 rotates on bearings 602 in support 603. Input shaft 601 may be in mechanical communication with, and may receive rotational energy from, a power source (e.g., engine 102, FIG. 1). Input shaft 601 includes a helical bevel gear portion 604. The helical bevel gear portion 604 of input shaft 601 meshes with, and transmits rotational energy to, bevel gear 605. Bevel gear 605 is attached to a shaft 606 that rotates on bearings 607 in support 608. Torque applied to bevel gear 605 may be transmitted via shaft 606 to other components via coupling 609. For example, coupling 609 may drive a spur gear that transfers power to a planetary gear set.

During operation, the forces generated by rotation and meshing of helical bevel gears 604 and 605 generate friction and heat, which lead to wear and deterioration of the gear components. Oil or grease may be used to lubricate helical bevel gears 604 and 605 in order to reduce wear. In other embodiments, solid lubricants may be embedded one or more of the gear components to protect the system.

In one embodiment, bevel gear portion 604 further comprises a lubricant assembly 609 having a solid lubricant 610 within a case 611. The case 611 may be made of a variety of materials, such as metal or a metallic alloy that conduct heat well. Solid lubricant 610 has a specific melting temperature. During operation, friction causes bevel gear portion 604 to heat up, which in turn heats lubricant assembly 609. As the bearing temperature reaches the melting temperature of lubricant 610, some or all of the solid lubricant liquifies into a fluid state that drips from opening 612 in lubricant assembly 609 onto bevel gear portion 604. The temperature of bevel gear gears 604 and 605 should drop due to the addition of lubricant 610. Opening 612 may be single slot that runs all the way around lubricant assembly 609 or may be a series of holes or slots distributed along an edge of lubricant assembly 609.

The fluid lubricant may be drawn toward opening 612 by gravity or by centrifugal force that is generated by rotation of shaft 601. In other embodiments, fluid lubricant 610 may be pushed toward opening 612 by forces internal to case 611. Internal forces or pressure may be generated by a spring 613 (FIG. 8) or by a pressurized gas or air within space 614.

A shield or cover 615 may be positioned over bevel gear portion 604 where it is not in contact with bevel gear 605 to prevent the fluid lubricant from being thrown onto other gearbox components.

In one embodiment, planetary carrier 400 and/or helical bevel gear set 600 may be components of a main rotor gearbox in a rotorcraft. The main gearbox has a lubrication system having jets that spray lubrication on moving components such as planetary gears 404 and helical bevel gears 604 and 605. The solid lubricant systems illustrated herein and/or other embodiments may be used as an emergency or backup lubrication system in the event of a loss of lubricant or overheat condition. For example, if the main rotor gearbox experiences a loss of lubrication event, then the gearbox will heat up due to increased friction in the unlubricated gears and bearings. Once the gearbox reaches a critical temperature, the solid lubricant would melt into a fluid state and would drip, seep, or be thrown onto the gears and/or bearings thereby providing lubrication in place of the failed lubrication system.

The solid lubricant has a melting temperature that is above the normal operating temperature of the gearbox by a safety margin. Under normal operating conditions, the gearbox lubrication system would aid in maintaining the normal operating temperature. Should that lubrication system fail, the gearbox will overheat. Once the solid lubricant melting temperature is reached, emergency or backup lubrication will be provided. For example, the melting temperature of the solid lubricant may be 50, 100, or more degree Fahrenheit above the expected operating temperature of the protected gear set.

The solid lubricant used in each gear sets may be selected based upon the lubricant's melting temperature and the normal operating temperature of the protected gear set. For example, planetary carrier 400 and helical bevel gear set 600 may operate at different temperatures under normal conditions. Accordingly, the materials used as solid lubricants 407 and 609 may be different compounds that are selected based upon a melting-temperature threshold that is above each gear set's operating temperature by a minimum safety margin.

In an example embodiment, an apparatus comprises a solid lubricant material having a melting point temperature at which it enters a fluid lubricant state. The apparatus also comprises a component configured to move during operation. The component is physically coupled to the solid lubricant material in a manner that allows the transfer of heat energy to the solid lubricant material. The solid lubricant material is configured to disperse fluid lubricant to the component when motion of the component generates sufficient heat energy to raise a temperature of the solid lubricant material above the melting point temperature.

The apparatus may further comprise a case surrounding the solid lubricant material having one or more openings in the case. The openings are adapted to allow the fluid lubricant to flow onto the component. The case may comprise a metal alloy adapted to transfer heat from the component to the solid lubricant material.

The apparatus may further comprise a gearbox housing and a planetary gear set disposed within the gearbox housing. The planetary gear set comprises a planetary carrier, and a plurality of planet gears. Each of the planet gears has a post for attaching the planet gear to the planetary carrier. The solid lubricant material is positioned within each post. There may be one or more holes in each of the posts. The holes are configured to align with the one or more openings in the case. The holes are adapted to allow the fluid lubricant to flow onto the associated planet gear and/or onto planet gear bearings. The melting point temperature for the lubricant material may be greater than a gearbox normal operating temperature by a threshold amount. The threshold amount ensures that the lubricant material enters a fluid state only in an overheat condition.

The apparatus may further comprise a spring mechanism positioned between the solid lubricant material and an interior wall of the case. The spring mechanism provides a force on the solid lubricant material in a direction toward the one or more openings.

The apparatus may further comprise a pressurized gas within the case. The pressurized gas is located between the solid lubricant material and an interior wall of the case. The pressurized gas provides a force on the solid lubricant material in a direction toward the one or more openings.

The apparatus may further comprise a gearbox housing, a first bevel gear configured to rotate with a first shaft, a second bevel gear configured to rotate with a second shaft, the second bevel gear positioned to engage with the first bevel gear, and the solid lubricant material positioned within the first shaft.

The apparatus may further comprise one or more openings in the case. The openings may be adapted to allow the fluid lubricant to flow onto the first bevel gear. The one or more openings in the case may be adapted to allow the fluid lubricant to flow at a location where the second bevel gear engages with the first bevel gear.

The apparatus may further comprise a cover positioned over the first bevel gear and adapted to capture the fluid lubricant.

The apparatus may further comprise a swashplate assembly having a plurality of bearings between a non-rotating portion and a rotating portion, and the solid lubricant material is positioned within the rotating portion. The solid lubricant material may enter a fluid state when heat generated in the rotating portion of the swashplate assembly is transferred to the solid lubricant material. The fluid lubricant may flow onto the swashplate bearings due to a gravitational force and/or a centrifugal force.

In an example embodiment, a rotorcraft comprises a body, a power train coupled to the body, the power train comprising a power source and a drive shaft coupled to the power source, a hub with a rotor blade coupled to the hub, a swashplate positioned about the drive shaft, a pitch link coupled between the swashplate and the hub corresponding to the rotor blade, and a bearing assembly coupled to the rotor blade. The bearing assembly comprises a bearing positioned within a bearing race, and a solid lubricant abutting the bearing race. The solid lubricant comprises a material that is configured to enter a fluid state above a certain temperature. The solid lubricant is located at a position to allow lubricant material to seep between the bearing and the bearing race when the lubricant material is in a fluid state.

The rotorcraft may further comprise a spring mechanism positioned apply a force against the solid lubricant so that the solid lubricant maintains physical contact with the bearing race.

The rotorcraft may further comprise a case surrounding the solid lubricant material having one or more openings in the case. The openings are adapted to allow the fluid lubricant to flow onto the bearing race. The case may comprise a metal alloy adapted to transfer heat from the component to the solid lubricant material. The rotorcraft may further comprise a pressurized gas within the case. The pressurized gas is located between the solid lubricant material and an interior wall of the case. The pressurized gas provides a force on the solid lubricant material in a direction toward the one or more openings.

The solid lubricant material may enter a fluid state when heat generated in the bearing assembly is transferred to the solid lubricant material. The fluid lubricant may flow onto the bearing race due to a gravitational force and/or a centrifugal force.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

What is claimed is:

1. An apparatus, comprising:
 a case surrounding a solid lubricant material having a melting point temperature at which it enters a fluid lubricant state;
 a gearbox housing; and
 a planetary gear set disposed within the gearbox housing, the planetary gear set comprising a planetary carrier and a plurality of planet gears, each of the planet gears having a post for attaching the planet gear to the planetary carrier, wherein the case and solid lubricant material is positioned within each post, wherein the planetary gear set is configured to move during operation;
 wherein the planetary gear set is physically coupled to the solid lubricant material in a manner that allows the transfer of heat energy to the solid lubricant material, and
 wherein the solid lubricant material is configured to disperse fluid lubricant to the planetary gear set through one or more openings in the case when motion of the planetary gear set generates sufficient heat energy to raise a temperature of the solid lubricant material above the melting point temperature.

2. The apparatus of claim 1, further comprising:
one or more holes in each of the posts, the holes configured to align with the one or more openings in the case, and wherein the holes are adapted to allow the fluid lubricant to flow onto the associated planet gear.

3. The apparatus of claim 1, further comprising:
one or more holes in each of the posts, the holes configured to align with the one or more openings in the case, and wherein the holes are adapted to allow the fluid lubricant to flow onto planet gear bearings.

4. The apparatus of claim 1, further comprising:
a spring mechanism positioned between the solid lubricant material and an interior wall of the case, wherein the spring mechanism provides a force on the solid lubricant material in a direction toward the one or more openings.

5. The apparatus of claim 1, wherein the case comprises a metal material adapted to transfer heat from the component to the solid lubricant material.

6. The apparatus of claim 1, wherein the melting point temperature for the lubricant material is greater than a gearbox normal operating temperature by a threshold amount, wherein the threshold amount ensures that the lubricant material enters a fluid state in an overheat condition.

7. The apparatus of claim 1, wherein the planetary carrier comprises a lower plate and an upper plate, each post coupled between the lower and upper plate.

8. The apparatus of claim 1, wherein the planetary carrier comprises an overhung planetary carrier having a plurality of downwardly-extending, cantilevered posts configured to receive each of the plurality of the planet gears.

\* \* \* \* \*